June 24, 1924.
F. J. KORLICK
1,498,631
COMBINED CLINOMETER AND COMPUTING INSTRUMENT
Filed May 29, 1922
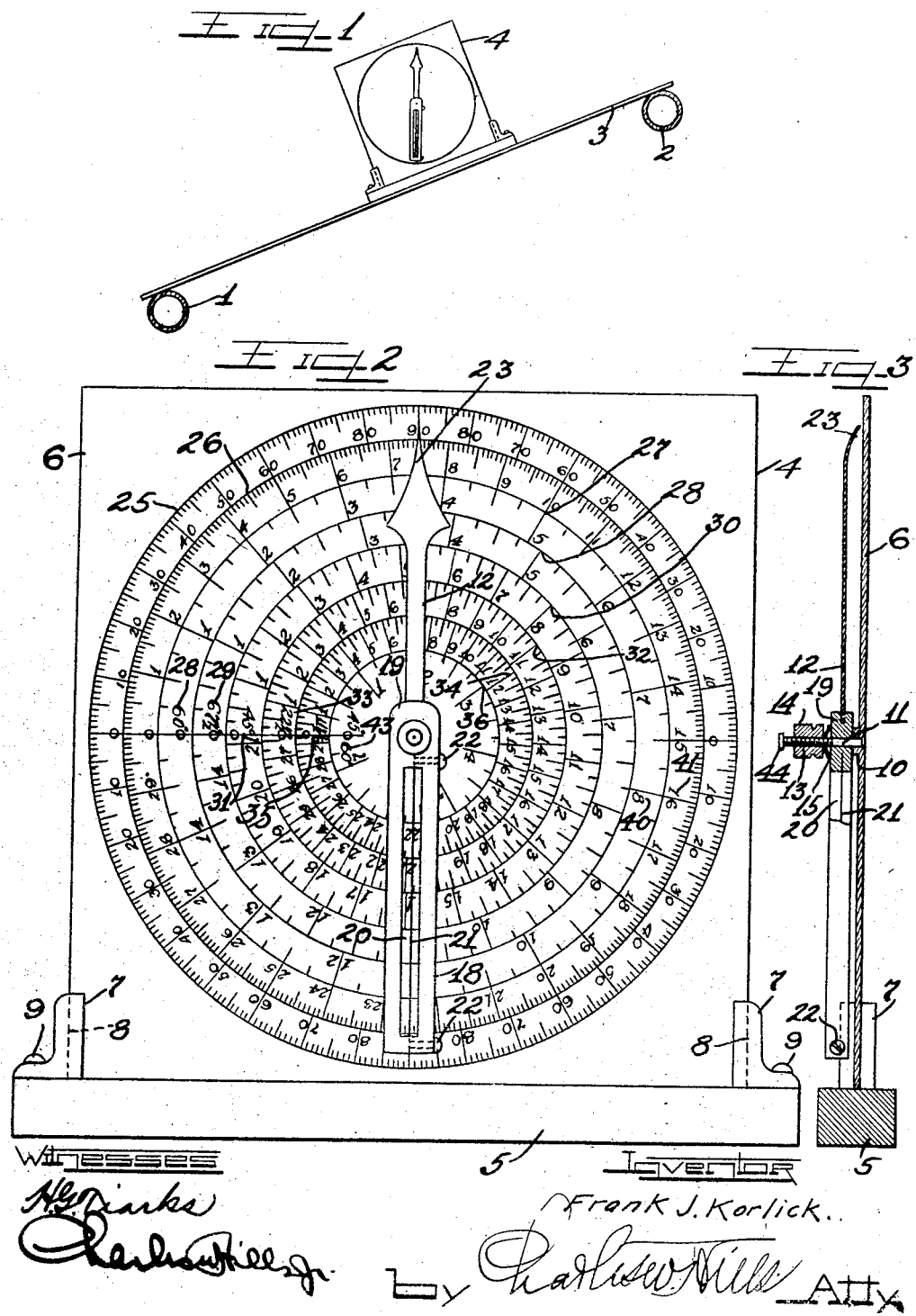

Patented June 24, 1924.

1,498,631

UNITED STATES PATENT OFFICE.

FRANK J. KORLICK, OF CHICAGO, ILLINOIS.

COMBINED CLINOMETER AND COMPUTING INSTRUMENT.

Application filed May 29, 1922. Serial No. 564,315.

*To all whom it may concern:*

Be it known that I, FRANK J. KORLICK, a citizen of the United States, and a resident of the city of Chicago, in the county of Cook and State of Illinois, have invented certain new and useful Improvements in a Combined Clinometer and Computing Instrument; and I do hereby declare that the following is a full, clear, and exact description of the same, reference being had to the accompanying drawings, and to the numerals of reference marked thereon, which form a part of this specification.

When installing pipes in a building, it frequently happens that the workman has occasion to connect two pipes together which do not stand at the same height and are not vertically above one another. Under these circumstances, it is frequently inconvenient for the workman to measure the oblique distance between the two pipes and then make the proper allowances for fitting, etc., so that the workman is apt to waste material by cutting a pipe too short for the connection or waste time by cutting a pipe too long and then being obliged to shorten it.

It is an object of this invention to provide an instrument which shall readily and certainly indicate to the workman the exact length of pipe to be used for making such a connection.

It is a further object of this invention to provide a means for quickly measuring the angle to the horizontal made by the line connecting two pipes.

It is a further object of this invention to provide an instrument which shall at the same time measure such an angle and indicate the length of pipe needed.

It occasionally happens that the workman is called upon to unite to a vertical pipe by means of a standard fitting which gives a 45° and another which gives a 60° angle a pipe sufficiently long to have the upper end of it at a given horizontal distance from the vertical pipe.

It is an object of this invention to provide an instrument which will enable the workman to quickly determine the length of pipe that must be cut and fitted into the combined fixture to provide the called-for horizontal distance.

Other and further important objects of this invention will be apparent from the disclosures in the accompanying drawings and specification.

The invention (in a preferred form) is illustrated in the drawings and hereinafter more fully described.

On the drawings:

Figure 1 is a view showing the application of this instrument to a pair of pipes.

Figure 2 is a front view of the instrument.

Figure 3 is a vertical central section of the instrument.

As shown on the drawings:

When it is necessary to connect a pipe 1 with another pipe 2, which is at a different height and also removed horizontally from the pipe 1, any convenient supporting base, such as a piece of board 3, is laid across the two pipes and the instrument 4 is placed on the board. The instrument has a foot 5 and an upright piece of sheet metal 6 which is secured to the foot 5 in any desired way. In the form illustrated, a pair of brackets 7 are provided at the two edges of the sheet 6 near the lower corners thereof. These brackets are grooved to receive the edges of the sheet 6, as shown at 8, and are fastened to the base 5 by means of screws 9.

At the center of the plate 6 is a boss 10 which serves to secure a pintle 11 in place. As illustrated, the pintle 11 is secured in the boss 10 by having the end of the pintle upset to form a rivet head, but any desired manner of securing the pintle may be used. Upon the pintle is mounted a pointer 12, and the portion of the pintle which projects above the pointer is screw-threaded, as shown at 13. Upon the threaded part of the pintle is mounted a nut 14, and between the nut and the pointer is a friction spring 15. The lower part of the pointer is made in the form of a frame 18 having two long radial portions and two short connecting portions. The one of these short connecting portions nearest the center serves as is shown at 19 as a central bearing for the pointer, and this portion 19 is traversed by the pintle 11 and affords a braking surface for the friction spring 15.

Between the two radial parts of the frame 18 is a slot 20 which serves to provide a view of a wire 21 which is secured in the frame by means of screws 22, one at each closed end of the frame.

The other end of the pointer from the frame 18 has a sharp point 23. As illustrated, this point is in the shape of an arrow head, but any conventional shape for a pointer may be used. As shown in Figure 3, the tip of the point 23 turns down toward the sheet 5 in order that the position of the pointer against the graduations upon the disk may be more readily perceived These graduations are arranged in concentric circles. The outermost circle 25 is graduated in degrees, the graduations starting from zero and going in both directions to ninety. The zero point is on a line through the center of the pintle 11 and as illustrated is parallel to the base 5. The ninety degree line therefore is through the same center and at right angles to the base 5. The next circle 26 is graduated in feet. The scale chosen is an arbitrary one, since the distance which the workman measures with his tape and not any reading of the instrument determines the point on this scale 26 to be observed. The zero point of this scale is in a line with the zero point of the scale 25.

The next scale 27 is likewise graduated in feet, but the scale of this circle is not arbitrary. It is related to the scale 26 in a way that is determined by the angle corresponding to the scale 27, and a designation 27', which in the case illustrated is 60°, is placed adjacent the zero of this scale to show that it is the scale to be used when the reading of the angle is sixty degrees. In the same way the scale 28 is graduated in feet but not upon an arbitrary scale. The graduations correspond to an angle of $67\frac{1}{2}$ degrees, as indicated by the designation 29. Likewise the graduations 30, as shown by the designation 31, correspond to an angle of 45 degrees, and the graduations 32 are shown by the designation 33 to correspond to $22\frac{1}{2}$ degrees. The next row of graduations 34, as shown by the designation 35, correspond to an angle of $11\frac{1}{4}$ degrees. The innermost circle of graduations 36 has a designation 43 to indicate that it belongs to the case where a 45° fixture and a 60° fixture are used in combination. Like all the other graduations except those of the outermost circle 25 the marks in 36 are read in feet.

In measuring inclinations the instrument is used in either of two positions according to whether the user is intending to determine the angle with the vertical or the angle with the horizontal. In the position illustrated in Figure 2 the angle with the vertical will be measured. The sheet 4 may, however, be lifted out of the grooves in the brackets 7 and turned through a quarter of a circle and set again in the brackets 7. The line of zeros will then be vertical instead of horizontal. If the instrument in the condition illustrated in Figure 2 is set upon the inclined board, as shown in Figure 1, the reading in the circle 25 will show in degrees the angle between the vertical and the inclined board. If the sheet 6 be turned through a quarter of a turn and the instrument set upon an inclined board, as shown in Figure 1, the reading of the circle 25 will show the angle between the horizontal and the inclined board.

Ordinarily in using the instrument the workman does not need to place it upon an inclined board since he is familiar with the several angles for which the manufacturers of piping make fittings, and therefore will know either by inspection of the work or by the directions given what the angle is to be. The five circles marked with a number of degrees are chosen to correspond to the fittings ordinarily supplied by piping manufacturing concerns.

If the two circles whose readings are to be simultaneously taken are not side by side the corresponding readings are selected by means of the wire 21. To do this the nut 14 is tightened until the spring 15 affords sufficient friction against the part 19 of the frame 18 to prevent accidental displacement of the pointer. The pointer is then rotated until the wire 21 is opposite the desired figure upon the selected circle, and then by looking along the wire to the circle 26, the reading in this circle corresponding to the distance at which the wire 21 was set upon, the selected circle can be found.

When the instrument is to be used to measure the angle at which a pipe is to be inclined, as illustrated in Figure 1, the nut 14 is loosened so that the spring 15 no longer presents friction to the member 19 of the frame 18. Gravity will then cause the pointer to assume a vertical position. An enlargement 44 is provided on the end of the pintle 15 to prevent the nut 14 from being completely removed from the pintle.

Assuming, for the sake of clearness, that the workman has determined that the pipe whose length he must find takes an angle of 60 degrees with the horizontal and that the horizontal distance between the two pipes which he wishes to connect is 8 feet. The workman will then use the circle of graduations 27 because the designation 27' shows that this goes with 60 degrees. In this circle he will find the place "8 feet," as shown at 40. He will then look in the circle 26 for the graduation radially opposite the 8 foot mark and there he finds, as shown at 41, a unit 16. He thus knows that the pipe in question must be 16 feet long.

As a further illustration, assume that the workman wishes to cut a pipe which is to extend obliquely at an angle of 45° to the horizontal, a distance sufficient to correspond to a horizontal measurement of $1\frac{1}{2}$ feet. He would do this by setting the wire 21 opposite $1\frac{1}{2}$ feet on the circle marked 45 degrees, that is on the circle 30, and reading from the circle 26 the correct length for the pipe.

The innermost circle 36 has at 43 a designation which reads 45 degrees plus 60 degrees. This designation indicates that the feet on this circle are to be used in connection with a pipe that is attached to a vertical pipe by means of two fixtures, one a 45 degree fixture and one a 60 degree fixture. This use of two fixtures, one a 45 degree fixture and the other a 60 degree fixture, is a common pipe-fitter's expedient for the case where a pipe runs along a wall and is to be brought out around a projecting part of the wall, but the calculation for such a case so that the proper length for the oblique pipe may be cut off has always presented difficulties for the workman. If the projection which is to be passed stands out 4 feet from the wall, the workman will set the wire 21 against the 4 foot mark on the circle 36, and then by looking along the wire to the circle 26 he will find the correct length for the oblique pipe. In the illustration chosen this is 15 feet and some inches.

I am aware that numerous details of construction may be varied through a wide range without departing from the principles of this invention, and I therefore do not purpose limiting the patent granted otherwise than necessitated by the prior art.

I claim as my invention:

1. In a computing instrument, a plurality of scales graduated in length, each scale being designated by an angle, the length separating the several graduations being proportional to a trigonometrical function of the angle indicating each particular scale.

2. In a computing instrument, a series of concentric circles of graduations, one of said circles being graduated in degrees and the remainder in distances, the distances separating the several graduations of the last mentioned circles being proportional to a trigonometrical function of the angle indicating each particular scale.

3. In a computing instrument, a plurality of scales graduated in length, each scale being designated by an angle, the length separating the several graduations being proportional to the cosine of the angle indicating each particular scale.

4. In a computing instrument, a plurality of series of graduations, the graduations having numerals indicating length, each series being marked by the indication of an angle, and the distances separating the graduations having like length indicating numerals, being proportional to the cosines of said angles.

5. In combination with a plurality of series of graduations, a series of numbered graduations representing length and designated by a mark indicating two angles, the distances between the graduations in said last named series being proportional to the distances between the graduations on the other series so that the last named graduations bear distances proportional to the product of the cosines of said two angles.

In testimony whereof I have hereunto subscribed my name in the presence of two subscribing witnesses:

FRANK J. KORLICK.

Witnesses:
 CARLTON HILL,
 JAMES P. O'BRIEN.